(12) United States Patent
Holderman et al.

(10) Patent No.: US 8,430,158 B2
(45) Date of Patent: Apr. 30, 2013

(54) SAND CONTROL SCREEN ASSEMBLY HAVING INTEGRAL CONNECTOR RINGS AND METHOD FOR MAKING SAME

(75) Inventors: Luke William Holderman, Plano, TX (US); Jean-Marc Lopez, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 327 days.

(21) Appl. No.: 12/871,110

(22) Filed: Aug. 30, 2010

(65) Prior Publication Data

US 2012/0048536 A1 Mar. 1, 2012

(51) Int. Cl.
*E03B 3/18* (2006.01)
*E21B 43/08* (2006.01)

(52) U.S. Cl.
USPC .......................................... 166/227; 166/236

(58) Field of Classification Search .................. 166/227, 166/236, 278, 51
See application file for complete search history.

(56) References Cited

U.S. PATENT DOCUMENTS

| | | | |
|---|---|---|---|
| 4,284,138 A | 8/1981 | Allred | |
| 4,378,840 A * | 4/1983 | Lilly | 166/233 |
| 5,318,119 A | 6/1994 | Lowry et al. | |
| 5,476,143 A * | 12/1995 | Sparlin et al. | 166/233 |
| 5,842,522 A | 12/1998 | Echols et al. | |
| 5,931,232 A | 8/1999 | Echols et al. | |
| 6,062,307 A | 5/2000 | Hamid et al. | |
| 6,227,303 B1 * | 5/2001 | Jones | 166/378 |
| 6,516,881 B2 * | 2/2003 | Hailey, Jr. | 166/278 |
| 6,581,689 B2 * | 6/2003 | Hailey, Jr. | 166/278 |
| 6,749,023 B2 * | 6/2004 | Nguyen et al. | 166/278 |
| 6,776,241 B2 | 8/2004 | Castano-Mears et al. | |
| 7,048,061 B2 * | 5/2006 | Bode et al. | 166/369 |
| 7,717,178 B2 | 5/2010 | Gaudette et al. | |
| 7,828,056 B2 * | 11/2010 | Dybevik et al. | 166/236 |
| 7,845,407 B2 * | 12/2010 | Bunnell et al. | 166/278 |
| 7,854,257 B2 | 12/2010 | Broome et al. | |

* cited by examiner

*Primary Examiner* — Kenneth L Thompson
(74) *Attorney, Agent, or Firm* — Lawrence R. Youst

(57) ABSTRACT

A screen jacket assembly for positioning around a base pipe (102) to form a sand control screen (100). The screen jacket assembly includes a screen jacket (112) formed from a plurality of circumferentially distributed axially extending ribs (114) and a screen wire (116) wrapped therearound. A pair of oppositely disposed connector rings (118, 126) is at least partially positionable around the first and second ends, respectively, of the screen jacket (112). The connector rings (118, 126) each have a plurality of openings (120, 128) in a sidewall portion thereof that are circumferentially alignable with at least a portion of the ribs (114) such that the connector rings (118, 126) are integrally connectable with the aligned ribs (114) via the openings (120, 128).

20 Claims, 6 Drawing Sheets

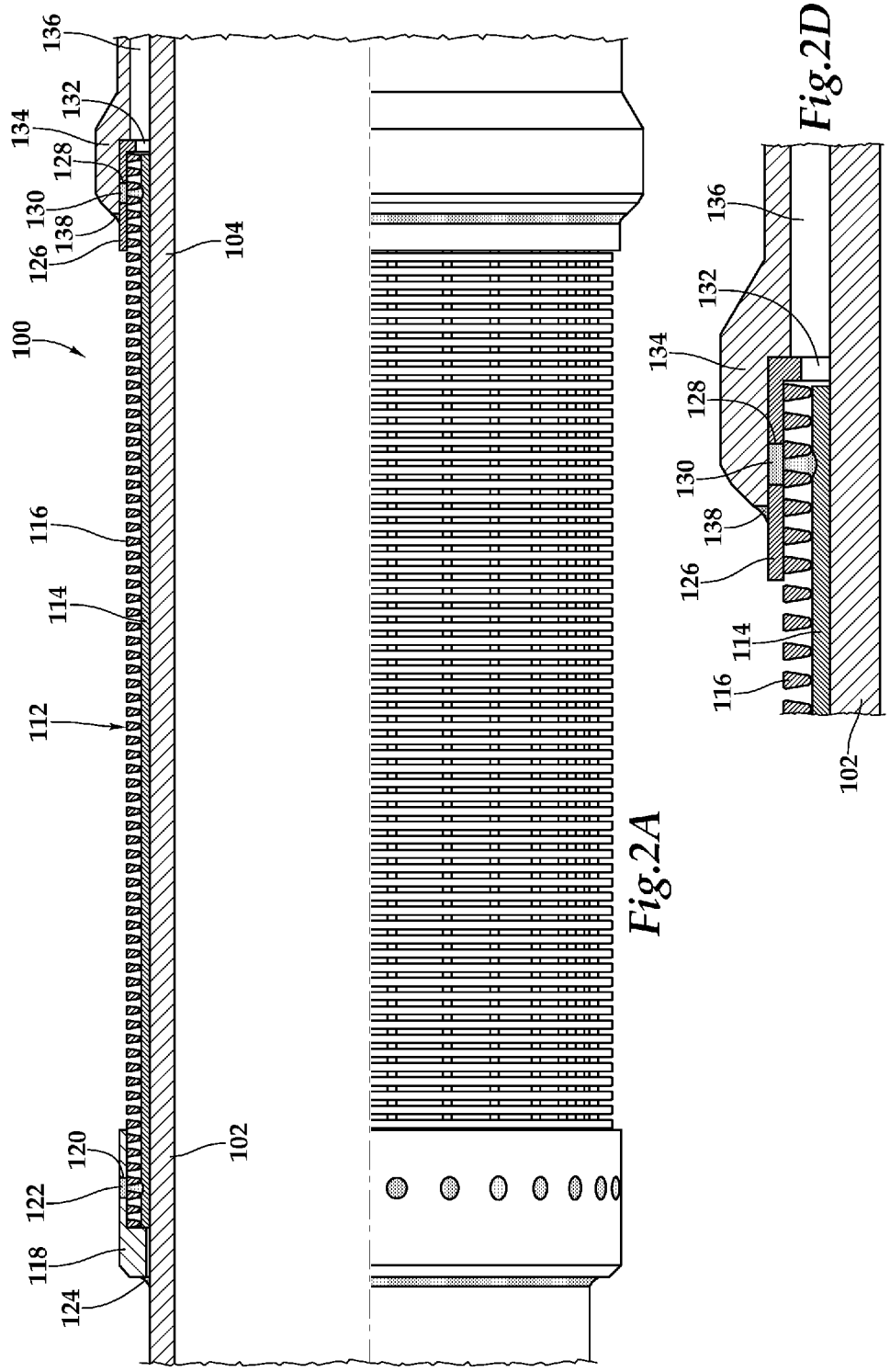

SAND CONTROL SCREEN ASSEMBLY HAVING INTEGRAL CONNECTOR RINGS AND METHOD FOR MAKING SAME

TECHNICAL FIELD OF THE INVENTION

This invention relates, in general, to equipment utilized in conjunction with operations performed in subterranean wells and, in particular, to sand control screen assemblies having integral connector rings and methods for making same.

BACKGROUND OF THE INVENTION

Without limiting the scope of the present invention, its background will be described with reference to producing fluid from a hydrocarbon bearing subterranean formation, as an example.

Since the beginning of oil production from subsurface formations, the industry has been concerned with efficient control of the movement of unconsolidated formation particles, such as sand, into the wellbore. For example, such formation movement commonly occurs during production from completions in loose sandstone or following hydraulic fracture of a formation. Production of these materials causes numerous problems in the operation of oil, gas or water wells. These problems include plugged formations, tubing and subsurface flow lines, as well as erosion of casing, downhole equipment and surface equipment. These problems lead to high maintenance costs and unacceptable well downtime. Accordingly, numerous methods have been utilized to control the movement of these unconsolidated formation particles during the production of fluids.

For example, one or more sand control screen assemblies are commonly included in the completion string to control the movement of formation particles. Such sand control screen assemblies are commonly constructed by installing one or more screen jackets on a perforated base pipe. The screen jackets typically include a single wire wrapped around a plurality of longitudinally extending ribs. Once installed on the base pipe, the ribs provide certain strength to the wire wrap and stand-off between the wire wrap and the base pipe for fluid travel. Conventionally, screen jackets have been secured to the base pipe by welding.

It has been found, however, that the process of welding a screen jacket to a base pipe is sometimes very difficult due to the difference in metallurgy of the components. For example, the material used for the base pipe may be 13 chrome while the material used for the screen jacket may be a special alloy such as 304L stainless steel, 316L stainless steel, Inconel, Hastelloy or Monel. Due to the difficulty of the welding process and the post-weld heat treatment, numerous types of failures have been observed in sand control screen assemblies. For example, it has been found, that the screen wire of the screen jacket may be damaged due to the heat of the welding process.

Accordingly, a need has arisen for an apparatus for attaching a screen jacket to a base pipe that does not require welding incompatibly different materials. A need has also arisen for such an apparatus that is simple and cost-effective to manufacture and that is capable of withstanding severe downhole conditions during installation and production.

SUMMARY OF THE INVENTION

The present invention disclosed herein comprises a sand control screen assembly for preventing the inflow of formation particles during production. The sand control screen assembly of the present invention does not require welding incompatibly different materials to connect a screen jacket to the base pipe. In addition, the sand control screen assembly of the present invention is simple and cost-effective to manufacture and is capable of withstanding severe downhole conditions during installation and production.

In one aspect, the present invention is directed to a screen jacket assembly for positioning around a base pipe to form a sand control screen. The screen jacket assembly includes a screen jacket formed from a plurality of circumferentially distributed axially extending ribs and a screen wire wrapped therearound. A pair of oppositely disposed connector rings is at least partially positionable around the first and second ends of the screen jacket. The connector rings each have a plurality of openings in a sidewall portion thereof that are circumferentially alignable with at least a portion of the ribs such that the connector rings are integrally connectable with the aligned ribs via the openings.

In one embodiment, the connector rings may be shrink rings that are heated prior to positioning around the screen jacket such that upon cooling, a sand tight seal is created between the shrink rings and the screen jacket. In certain embodiments, the number of openings in each of the connector rings has a one to one relationship with the number of ribs. In other embodiments, the number of openings in each of the connector rings has a less than one to one relationship with the number of ribs including embodiment wherein the number of openings in each of the connector rings has a no more than one half to one relationship with the number of ribs. Once constructed, the ribs are operable to share a load between the connector rings, such as a torsional load, a tensile load, a compression load or the like. In certain embodiments, there are welded connections between the connector rings and the aligned ribs via the openings.

In another aspect, the present invention is directed to a sand control screen assembly that includes a base pipe and a screen jacket operably positionable around the base pipe. The screen jacket includes a plurality of circumferentially distributed axially extending ribs and a screen wire wrapped around the ribs. A pair of oppositely disposed connector rings is at least partially positionable around the first and second ends of the screen jacket. The connector rings each have a plurality of openings in a sidewall portion thereof that are circumferentially alignable with at least a portion of the ribs such that the connector rings are integrally connectable with the aligned ribs via the openings. The connector rings are operably positionable around the base pipe.

In a further aspect, the present invention is directed to a method for manufacturing a screen jacket assembly for positioning around a base pipe to form a sand control screen. The method includes forming a screen jacket including a plurality of circumferentially distributed axially extending ribs and a screen wire wrapped therearound, positioning a pair of connector rings at least partially around first and second ends, respectively, of the screen jacket, circumferentially aligning openings formed in a sidewall portion of each connector ring with at least a portion of the ribs and integrally connecting the connector rings with the aligned ribs via the openings.

The method may also include heating the connector rings prior to positioning the connector rings at least partially around first and second ends of the screen jacket, cooling the connector rings after positioning the connector rings at least partially around first and second ends of the screen jacket to form a sand tight seal, sharing a torsional load between the connector rings with the ribs, sharing a tensile load between the connector rings with the ribs or weldably connecting the connector rings with the aligned ribs via the openings.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIGS. 2A-2C are quarter sectional view of successive axial sections of a sand control screen assembly according to an embodiment of the present invention;

FIG. 2D is a cross sectional view of a portion of a sand control screen assembly according to an embodiment of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
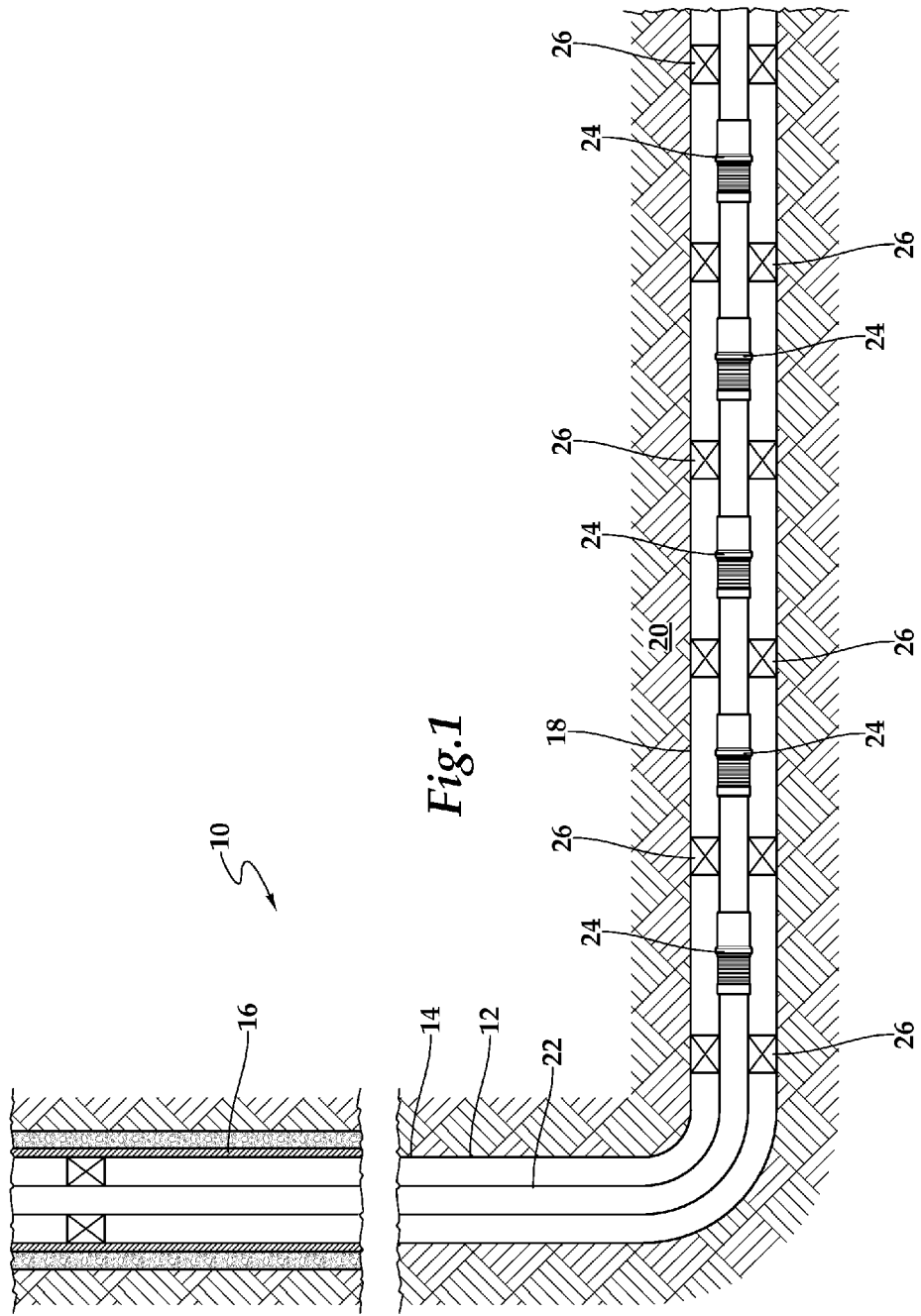
FIG. 1 is a schematic illustration of a well system operating a plurality of sand control screen assemblies according to an embodiment of the present invention.
Figure 2B:
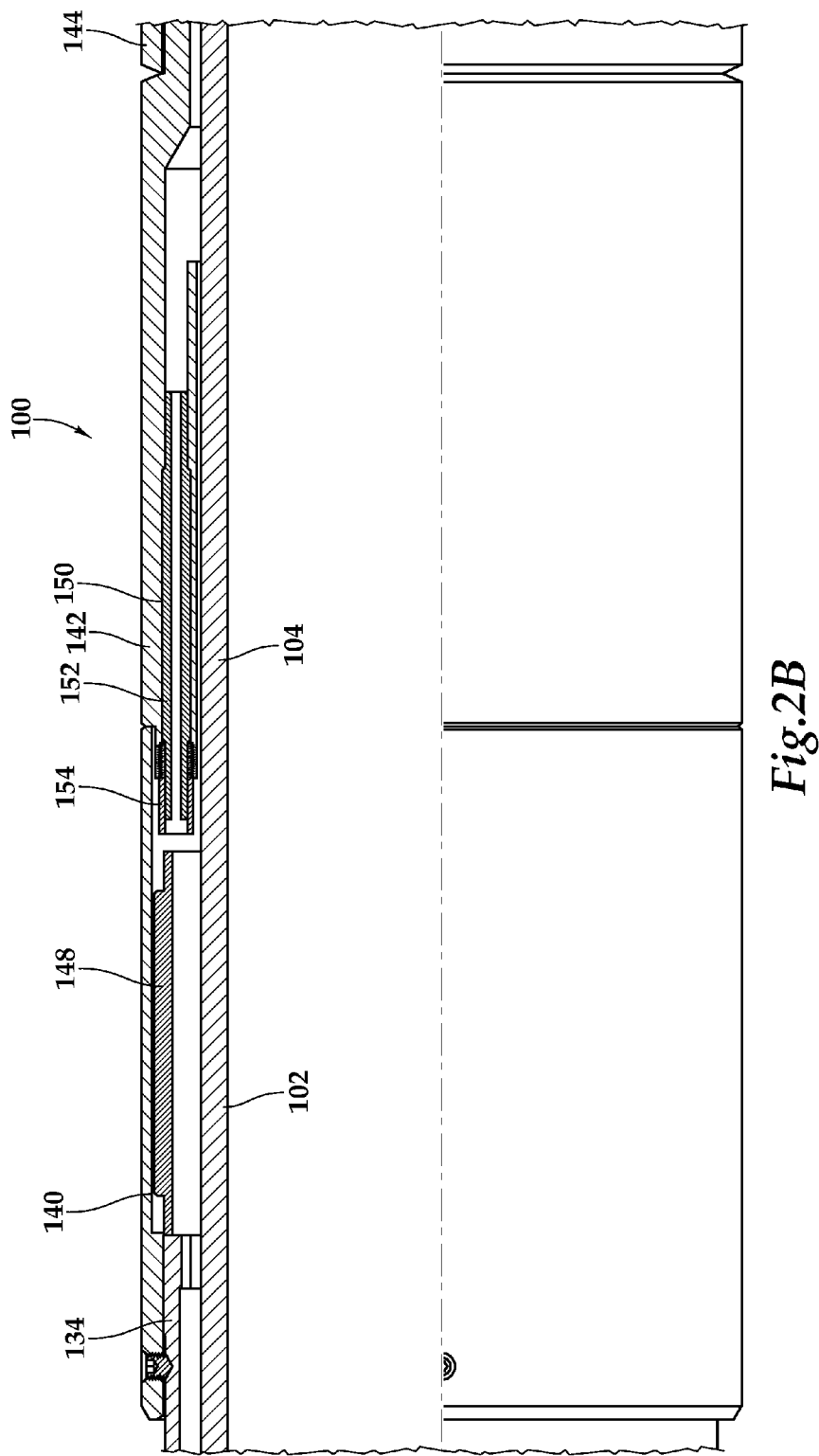
Figure 2C:
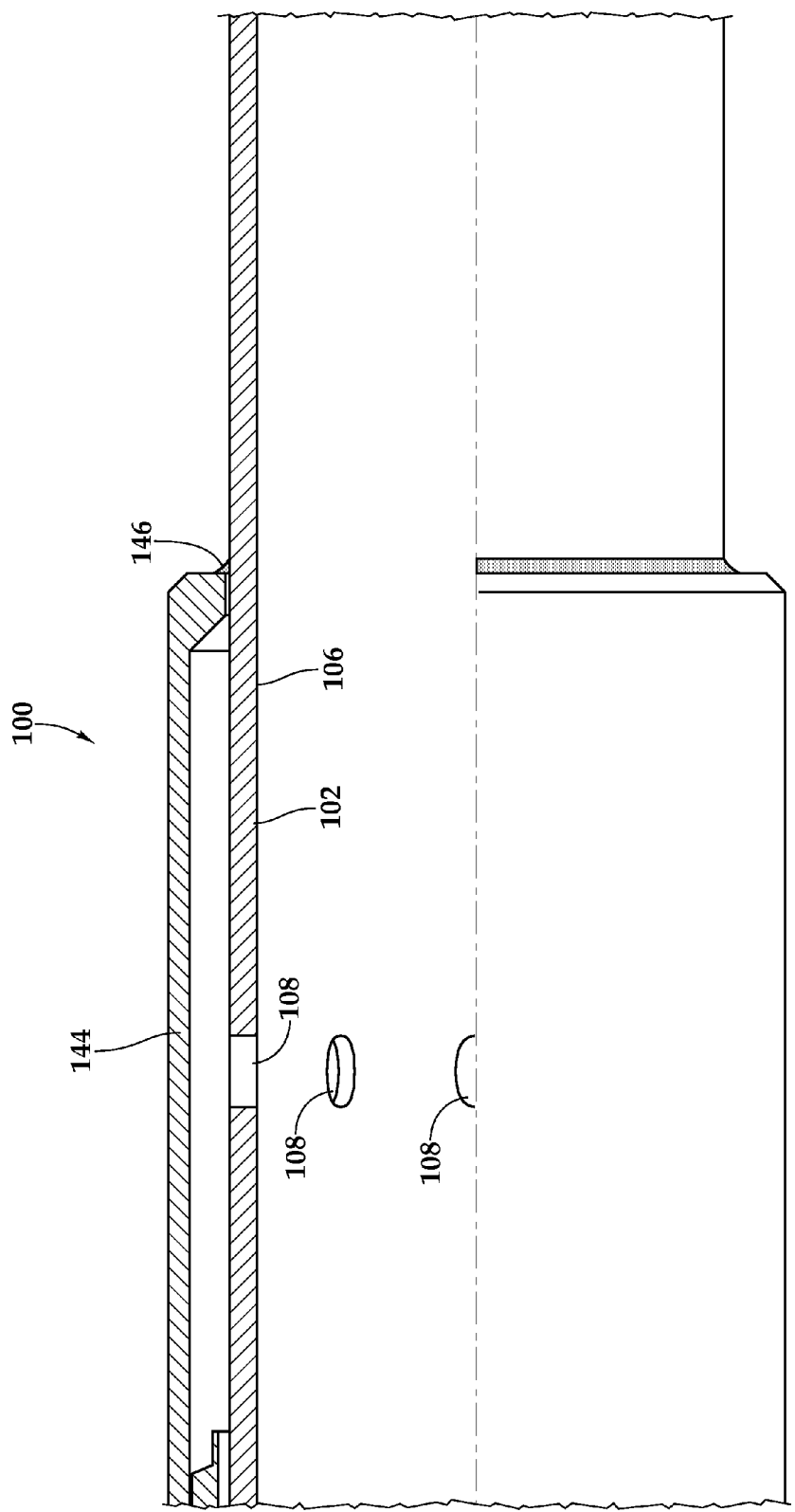

Referring initially to FIG. 1, therein is depicted a well system including a plurality of sand control screens embodying principles of the present invention that is schematically illustrated and generally designated 10. In the illustrated embodiment, a wellbore 12 extends through the various earth strata. Wellbore 12 has a substantially vertical section 14, the upper portion of which has cemented therein a casing string 16. Wellbore also has a substantially horizontal section 18 that extends through a hydrocarbon bearing subterranean formation 20. As illustrated, substantially horizontal section 18 of wellbore 12 is open hole.

Positioned within wellbore 12 and extending from the surface is a tubing string 22. Tubing string 22 provides a conduit for formation fluids to travel from formation 20 to the surface. At its lower end, tubing string 22 is coupled to a completions string that has been installed in wellbore 12 and divides the completion interval into various production intervals adjacent to formation 20. The completion string includes a plurality of sand control screens 24, each of which is positioned between a pair of packers 26 that provides a fluid seal between the completion string 22 and wellbore 12, thereby defining the production intervals. Sand control screens 24 serve the primary functions of filtering particulate matter out of the production fluid stream. In the illustrated embodiment, sand control screens 24 may also be useful in controlling the flow rate of the production fluid stream.

Even though FIG. 1 depicts the sand control screens of the present invention in an open hole environment, it should be understood by those skilled in the art that the flow control screens of the present invention are equally well suited for use in cased wells. Also, even though FIG. 1 depicts one sand control screen in each production interval, it should be understood by those skilled in the art that any number of sand control screens of the present invention may be deployed within a production interval without departing from the principles of the present invention. Further, even though FIG. 1 depicts each sand control screen as having a single screen jacket, it should be understood by those skilled in the art that any number of screen jackets may be installed on a single sand control screen of the present invention without departing from the principles of the present invention.

In addition, even though FIG. 1 depicts the sand control screens of the present invention in a horizontal section of the wellbore, it should be understood by those skilled in the art that the sand control screens of the present invention are equally well suited for use in deviated wellbores, vertical wellbores, multilateral wellbore and the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring next to FIGS. 2A-2D, therein is depicted successive axial sections of a sand control screen assembly according to the present invention that is representatively illustrated and generally designated 100. Sand control screen assembly 100 may be suitably coupled to other similar sand control screen assemblies, production packers, locating nipples, production tubulars or other downhole tools to form a completions string such as that described above. Sand control screen assembly 100 includes a base pipe 102 that has a blank pipe section 104 and a perforated section 106 including a plurality of production ports 108. Positioned around an upper portion of blank pipe section 104 is a screen jacket 112 that serves as a filter medium and may be in the form of a single layer wire wrap screen, a multilayer wire wrap screen, a prepacked screen, a woven wire mesh screen or the like, designed to allow fluids to flow therethrough but prevent particulate matter of a predetermined size from flowing therethrough. In the illustrated embodiment, screen jacket 112 includes a plurality of circumferentially distributed axially extending ribs 114 with a screen wire 116 wrapped around the ribs.

A connector ring 118 is positioned around the uphole end of screen jacket 112. Connector ring 118 has a plurality of openings 120 in a sidewall portion thereof that are circumferentially aligned with ribs 114 of screen jacket 112. Connector ring 118 is integrally connected with ribs 114 via welded connections 122 through openings 120. Preferably, connector ring 118 is a shrink ring that is heated prior to positioning around screen jacket 112 such that upon cooling, a sand tight seal is created between connector ring 118 and screen jacket 112. In the illustrated embodiment, connector ring 118 is operably associated with base pipe 102 in the form of a securable connection illustrated as weld 124. The material of connector ring 118 is selected based upon factors including its thermal properties, its chemical resistance, its compatibility to be welded to base pipe 102, its compatibility to be welded to screen jacket 112 and the like. Even though the material of screen jacket 112 may be incompatible for welding to base pipe 102, the use of connector ring 118 as an intermediate device between screen jacket 112 and base pipe 102 enables welding of connector ring 118 to both base pipe 102 and screen jacket 112. For example, suitable materials for connector ring 118 include 13 chrome, 304L stainless steel, 316L stainless steel, 420 stainless steel, 410 stainless steel, Incoloy 825 or similar alloys. In certain embodiments, connector ring 118 may be the same material of base pipe 102, which eliminates any material incompatibility for welding. In other embodiments, connector ring 118 may be the same material of screen wire 116, which eliminates welding directly between screen jacket 112 and base pipe 102. In still other embodiment, connector ring 118 may be a material that is different from that of both base pipe 102 and screen wire 116.

A connector ring 126 is positioned around the downhole end of screen jacket 112. Connector ring 126 has a plurality of openings 128, only one being visible in FIG. 2A, in a sidewall portion thereof that are circumferentially aligned with ribs 114 of screen jacket 112. Connector ring 126 is integrally connected with ribs 114 via welded connections 130 through openings 128, as best seen in FIG. 2D. Preferably, connector ring 126 is a shrink ring that is heated prior to positioning around screen jacket 112 such that upon cooling, a sand tight seal is created between connector ring 126 and screen jacket 112. In the illustrated embodiment, connector ring 126 is operably associated with base pipe 102 forming a fluid passageway 132 therebetween. The material of connector ring 126 is selected based upon factors including its thermal properties, its chemical resistance, its compatibility to be welded to other sand control screen components and the like.

Positioned downhole of screen jacket 112 is a screen interface housing 134 that forms an annulus 136 with base pipe 102. Preferably, screen interface housing 134 and connector ring 126 are operably associated with one another in the form of a securable connection illustrated as weld 138. Securably connected to the downhole end of screen interface housing 134 is a sleeve housing 140. At its downhole end, sleeve housing 140 is securably connected to a flow tube housing 142. Flow tube housing 142 is preferably securably connected or sealably coupled to base pipe 102 to prevent fluid flow therebetween. Toward its downhole end, flow tube housing 142 is securably connected to a lower housing 144 which is preferably welded to base pipe 102 at its downhole end as indicated at 146. The various connections of the housing sections may be made in any suitable fashion including welding, threading and the like as well as through the use of fasteners such as pins, set screws and the like. Together, the housing sections create a generally annular fluid flow path between screen jacket 112 and production ports 108 of base pipe 102.

Positioned in the annular region between housing sleeve 140 and base pipe 102 is a split ring spacer 148. Positioned within axial openings 150 in flow tube housing 142 is a plurality of flow tubes 152. The illustrated embodiment includes six axial openings 150 and six flow tubes 152, only one being visible, however, those skilled in the art will recognize that other numbers of flow tubes both greater than and less than six could alternatively be used and would be considered within the scope of the present invention. Each of the flow tubes 152 is secured within flow tube housing 142 by a threaded retaining sleeve 154. One or more of the flow tube 152 may have a threaded cap or a plug (not pictured) associated therewith to inhibit or stop flow therethrough. The use of plugs and flow tubes 152 having various inner diameters allow an operator to adjust the pressure drop rating of each sand control screen 100 to a desired level such that a completion string including a plurality of sand control screens 100 is operable to counteract heel-toe effects in long horizontal completions, balance inflow in highly deviated and fractured wells, reduce annular sand transportation and reduce water/gas influx, thereby lengthening the productive life of the well.

Figure 3:
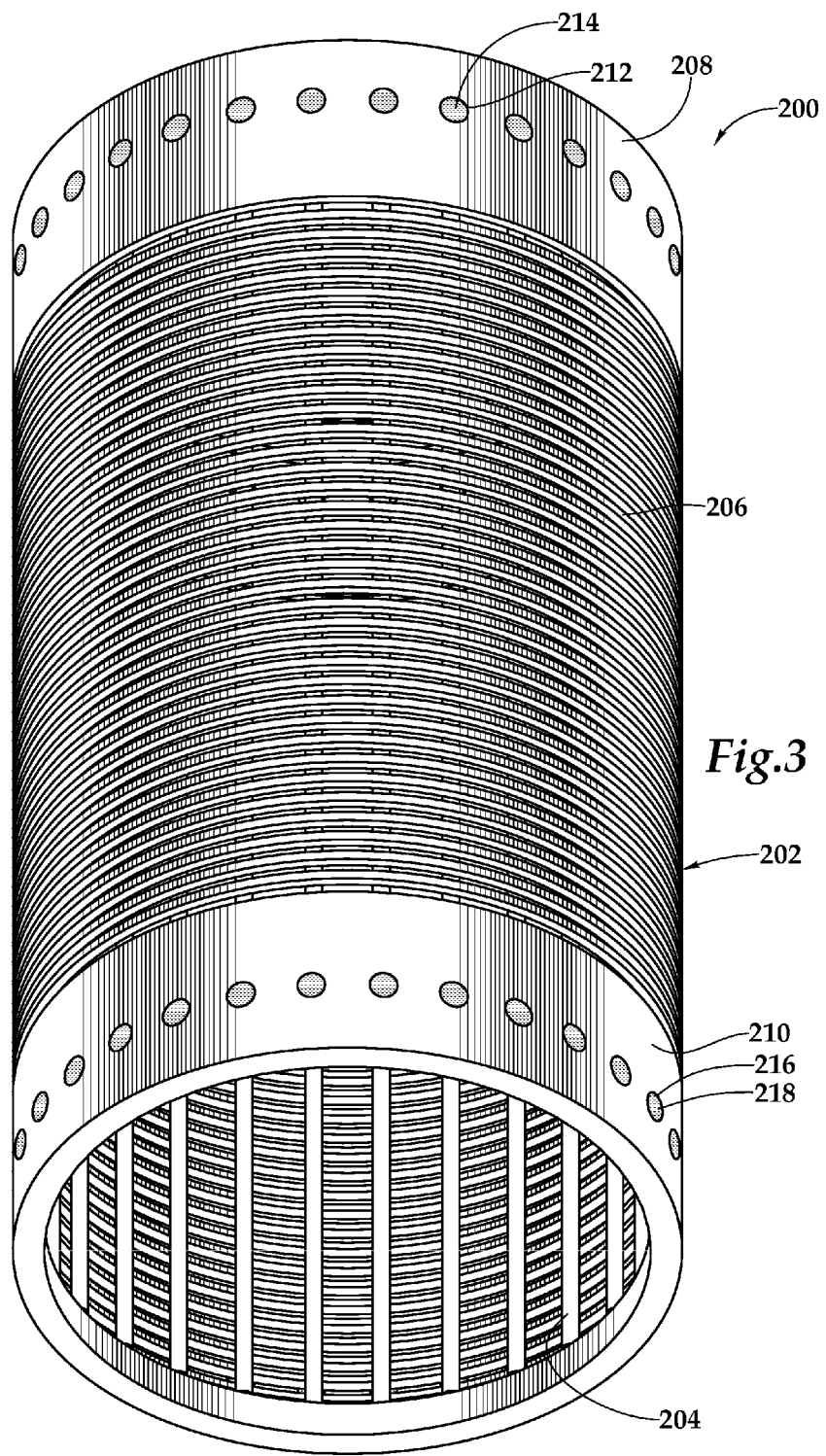
FIG. 3 is a side view partially cut away and partially in cross section of a sand control screen assembly according to an embodiment of the present invention.

Referring next to FIG. 3, therein is depicted a screen jacket assembly of the present invention that is generally designated 200. Screen jacket assembly 200 includes a screen jacket 202 that serves as a filter medium designed to allow fluids to flow therethrough but prevent particulate matter of a predetermined size from flowing therethrough. Screen jacket 202 includes a plurality of circumferentially distributed axially extending ribs 204 with a screen wire 206 wrapped around the ribs. A pair of connector rings 208, 210 is positioned at opposite ends of screen jacket 202. Connector ring 208 has a plurality of openings 212 in a sidewall portion thereof that are circumferentially aligned with ribs 204 of screen jacket 202. Connector ring 208 is integrally connected with ribs 204 via welded connections 214 through openings 212. Similarly, connector ring 210 has a plurality of openings 216 in a sidewall portion thereof that are circumferentially aligned with ribs 204 of screen jacket 202. Connector ring 210 is integrally connected with ribs 204 via welded connections 218 through openings 216.

As discussed above, connector rings 208, 210 may be shrink rings that are heated prior to positioning around screen jacket 202. Once in place such that openings 212, 216 properly align with ribs 204, connector rings 208, 210 may be allowed to cool forming a sand tight seal between connector rings 208, 210 and screen jacket 202. Thereafter, in the illustrated embodiment, each of the ribs 204 is integrally connected to connector ring 208 and connector ring 210. Specifically, connector ring 208 is integrally connected to ribs 204 via welds 214 using a tungsten inert gas (TIG) welding process, a metal inert gas (MIG) welding process or other suitable welding process or connecting process. Likewise, connector ring 210 is integrally connected to ribs 204 via welds 218. The integral connection between connector rings 208, 210 and ribs 204 enables ribs 204 to share a load between connector rings 208, 210, such as a torsional load, a tensile load, a compression load or the like that may be applied between connector rings 208, 210 when a sand control screen assembly including screen jacket 202 is run in the well.

Figure 4:
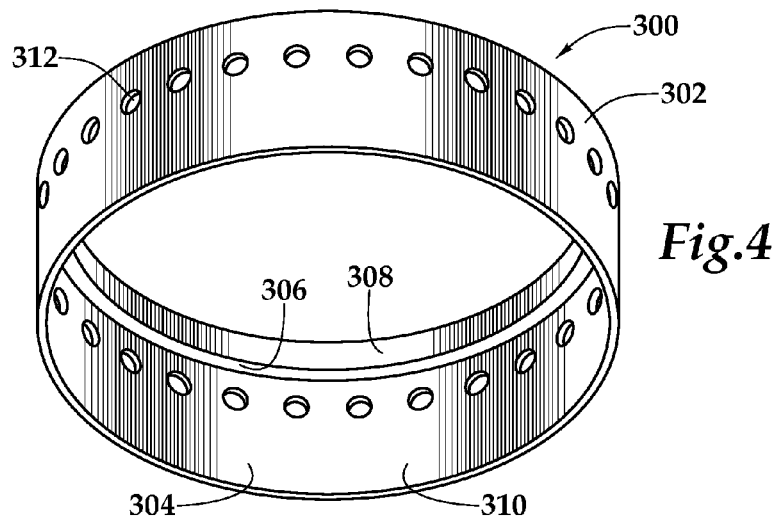
FIG. 4 isometric view of one embodiment of a connector ring for use in a sand control screen assembly of the present invention.

Referring next to FIG. 4, therein is depicted a connector ring of the present invention that is generally designated 300. Connector ring 300 may be used in conjunction with screen jacket 202 and is representative of connector ring 208 and connector ring 210. Connector ring 300 has a substantially cylindrical body 302. In the illustrated embodiment, connector ring 300 has a radially stepped inner profile 304 having a shoulder 306 between a radially thicker portion 308 and a radially thinner portion 310. Preferably, shoulder 306 serves a stop and provides for axial alignment when connector ring 300 is positioned around a screen jacket. In the illustrated embodiment, connector ring 300 includes thirty openings 312 formed in the sidewall portion thereof. Once connector ring 300 is axially positioned around a screen jacket, openings 312 are preferably circumferentially aligned with an equal number of ribs of the screen jacket. Thereafter, connector ring 300 is integrally coupled to the screen jacket by, for example, welding the ribs to connector ring 300 through openings 312.

Even though connector rings 118, 126, 208, 210, 300 have been depicted and described as having a thirty openings, it should be understood by those skilled in the art that the connector rings of the present invention could have different numbers of openings either greater than or less than thirty, without departing from the principles of the present invention. The required number of openings will depend upon factors such as the diameter and design of the screen jacket. In addition, even though FIGS. 2-4 have depicted and described connector rings 118, 126, 208, 210, 300 as having a one to one relationship between the number of openings of a connector ring and the number of ribs, it should be understood by those skilled in the art that the number openings of the connector rings of the present invention could have a different relationship to the number of ribs of the screen jacket.

Figure 5:
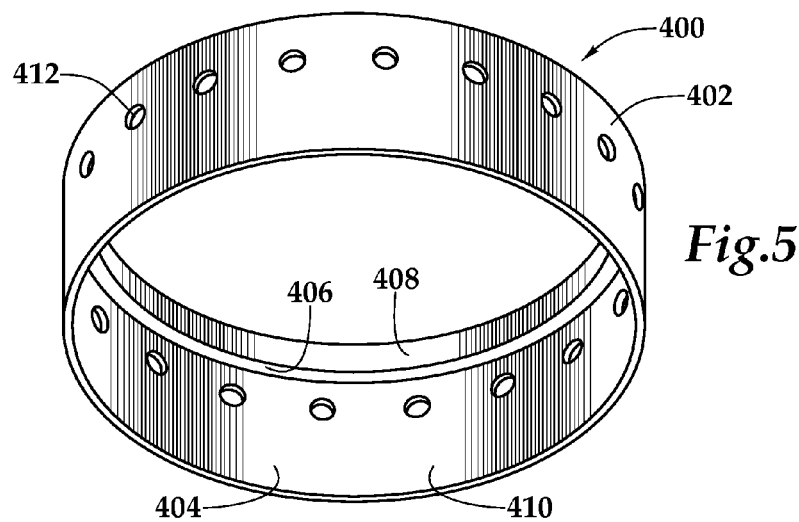
FIG. 5 isometric view of one embodiment of a connector ring for use in a sand control screen assembly of the present invention.

For example, as best seen in FIG. 5, connector ring 400 may be used in conjunction with screen jacket 202 and may replace connector ring 208 or connector ring 210. Connector ring 400 has a substantially cylindrical body 402. In the illustrated embodiment, connector ring 400 has a radially stepped inner profile 404 having a shoulder 406 between a radially thicker portion 408 and a radially thinner portion 410. In the illustrated embodiment, connector ring 400 includes twenty openings 412 formed in the sidewall portion thereof. Once connector ring 400 is axially positioned around a screen jacket, openings 412 are preferably circumferentially aligned with an equal number of ribs of the screen jacket, which may be a subset of all the ribs of the screen jacket. Thereafter, connector ring 400 is integrally coupled to the screen jacket by, for example, welding the ribs to connector ring 400 through opening 412.

Figure 6:
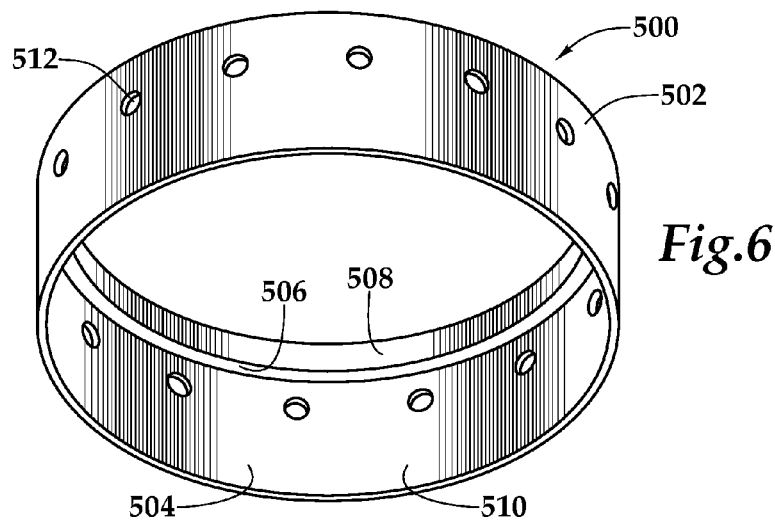
FIG. 6 isometric view of one embodiment of a connector ring for use in a sand control screen assembly of the present invention.

As another example, as best seen in FIG. 6, connector ring 500 may be used in conjunction with screen jacket 202 and may replace connector ring 208 or connector ring 210. Connector ring 500 has a substantially cylindrical body 502. In the illustrated embodiment, connector ring 500 has a radially stepped inner profile 504 having a shoulder 506 between a radially thicker portion 508 and a radially thinner portion 510. In the illustrated embodiment, connector ring 500 includes fifteen openings 512 formed in the sidewall portion thereof. Once connector ring 500 is axially positioned around a screen jacket, openings 512 are preferably circumferentially aligned with an equal number of ribs of the screen jacket, which may be a subset of all the ribs of the screen jacket. Thereafter, connector ring 500 is integrally coupled to the screen jacket by, for example, welding the ribs to connector ring 500 through opening 512.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A screen jacket assembly for positioning around a base pipe to form a sand control screen, the assembly comprising:
    a screen jacket including a plurality of circumferentially distributed axially extending ribs and a screen wire wrapped therearound; and
    a pair of oppositely disposed connector rings at least partially positionable around first and second ends, respectively, of the screen jacket, the connector rings each having a plurality of openings in a sidewall portion thereof that are circumferentially alignable with at least a portion of the ribs such that the connector rings are integrally connectable with the aligned ribs via the openings such that the ribs are operable to share a torsional load between the connector rings.

2. The screen jacket assembly as recited in claim 1 wherein the connector rings further comprise shrink rings that are heated prior to positioning around the screen jacket such that upon cooling, a sand tight seal is created between the shrink rings and the screen jacket.

3. The screen jacket assembly as recited in claim 1 wherein the number of openings in each of the connector rings has a one to one relationship with the number of ribs.

4. The screen jacket assembly as recited in claim 1 wherein the number of openings in each of the connector rings has a less than one to one relationship with the number of ribs.

5. The screen jacket assembly as recited in claim 1 wherein the number of openings in each of the connector rings has a no more than one half to one relationship with the number of ribs.

6. The screen jacket assembly as recited in claim 1 wherein the ribs are operable to share a tensile load between the connector rings.

7. The screen jacket assembly as recited in claim 1 further comprising a plurality of welded connections between the connector rings and the aligned ribs via the openings.

8. A sand control screen assembly comprising:
    a base pipe;
    a screen jacket including a plurality of circumferentially distributed axially extending ribs and a screen wire wrapped around the ribs, the screen jacket operably positionable around the base pipe; and
    a pair of oppositely disposed connector rings at least partially positionable around first and second ends, respectively, of the screen jacket, the connector rings each having a plurality of openings in a sidewall portion thereof that are circumferentially alignable with at least a portion of the ribs such that the connector rings are integrally connectable with the aligned ribs via the openings such that the ribs are operable to share a torsional load between the connector rings, the connector rings operably positionable around the base pipe.

9. The sand control screen assembly as recited in claim 8 wherein the connector rings further comprise shrink rings that are heated prior to positioning around the screen jacket such that upon cooling, a sand tight seal is created between the shrink rings and the screen jacket.

10. The sand control screen assembly as recited in claim 8 wherein the number of openings in each of the connector rings has a one to one relationship with the number of ribs.

11. The sand control screen assembly as recited in claim 8 wherein the number of openings in each of the connector rings has a less than one to one relationship with the number of ribs.

12. The sand control screen assembly as recited in claim 8 further comprising a plurality of welded connections between the connector rings and the aligned ribs via the openings.

13. The sand control screen assembly as recited in claim 8 wherein the connector rings are integrally connectable with the base pipe.

14. The sand control screen assembly as recited in claim 8 wherein the connector rings are weldably connectable with the base pipe.

15. The sand control screen assembly as recited in claim 8 wherein a fluid passageway is formed between at least one of the connector rings and the base pipe.

16. A method for manufacturing a screen jacket assembly for positioning around a base pipe to form a sand control screen, the method comprising:
    forming a screen jacket including a plurality of circumferentially distributed axially extending ribs and a screen wire wrapped therearound;
    positioning a pair of connector rings at least partially around first and second ends, respectively, of the screen jacket;

circumferentially aligning openings formed in a sidewall portion of each connector ring with at least a portion of the ribs;

integrally connecting the connector rings with the aligned ribs via the openings; and sharing a torsional load between the connector rings with the ribs.

17. The method as recited in claim 16 further comprising heating the connector rings prior to positioning the connector rings at least partially around first and second ends of the screen jacket.

18. The method as recited in claim 17 further comprising cooling the connector rings after positioning the connector rings at least partially around first and second ends of the screen jacket to form a sand tight seal.

19. The method as recited in claim 16 further comprising sharing a tensile load between the connector rings with the ribs.

20. The method as recited in claim 16 wherein integrally connecting the connector rings with the aligned ribs via the openings further comprises weldably connecting the connector rings with the aligned ribs via the openings.

\* \* \* \* \*